US012165153B2

(12) United States Patent
Benkreira et al.

(10) Patent No.: US 12,165,153 B2
(45) Date of Patent: Dec. 10, 2024

(54) COMPUTATIONALLY EFFICIENT THEFT DETECTION

(71) Applicant: Capital One Services, LLC, McLean, VA (US)

(72) Inventors: Abdelkader M'hamed Benkreira, Brooklyn, NY (US); Joshua Edwards, Philadelphia, PA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 311 days.

(21) Appl. No.: 17/650,557

(22) Filed: Feb. 10, 2022

(65) Prior Publication Data

US 2023/0252476 A1 Aug. 10, 2023

(51) Int. Cl.
*H04L 9/40* (2022.01)
*G06F 21/88* (2013.01)
*G06Q 20/40* (2012.01)

(52) U.S. Cl.
CPC ......... *G06Q 20/4016* (2013.01); *G06F 21/88* (2013.01); *G06Q 20/401* (2013.01); *G06Q 20/405* (2013.01); *H04L 63/1491* (2013.01)

(58) Field of Classification Search
CPC ........ G06F 21/34; G06F 21/55; G06F 21/554; G06F 21/88; G06F 2221/2125; G06F 2221/2127; H04L 63/0838; H04L 63/0853; H04L 63/102; H04L 63/1491; G06Q 20/354; G06Q 20/385; G06Q 20/3572
See application file for complete search history.

(56) References Cited

U.S. PATENT DOCUMENTS

| 6,955,294 | B1* | 10/2005 | Seegar | G06Q 40/03 235/379 |
| 11,138,593 | B1* | 10/2021 | Ho | G06Q 20/382 |
| 11,507,935 | B1* | 11/2022 | Ellis | G06Q 30/0269 |
| 2003/0218062 | A1* | 11/2003 | Noriega | G06Q 20/4012 235/380 |

(Continued)

FOREIGN PATENT DOCUMENTS

| CN | 2379841 Y | 5/2000 |
| CN | 2453491 Y | 10/2001 |
| GB | 2398417 A | 8/2004 |

*Primary Examiner* — Eric W Shepperd
(74) *Attorney, Agent, or Firm* — Harrity & Harrity, LLP

(57) ABSTRACT

In some implementations, a backend server and/or a middleman server may receive, from a front-end device, a request including an indication of a physical identifier associated with a user. The backend server and/or the middleman server may determine that the physical identifier is associated with an indication of theft. Accordingly, the backend server and/or the middleman server may transmit the indication of theft to one or more additional backend servers associated with the user. Additionally, the backend server and/or the middleman server may transmit, to a user device, a coded message indicating theft, where the coded message is sent using a communication method consistent with a setting associated with the user. In some implementations, the backend server and/or the middleman server may transmit a one-time authorization to the front-end device and may store an indication not to authorize an additional request including the indication of the physical identifier.

20 Claims, 11 Drawing Sheets

(56) References Cited

U.S. PATENT DOCUMENTS

| | | | | |
|---|---|---|---|---|
| 2004/0015450 | A1* | 1/2004 | Zingher | G07F 7/1083 |
| | | | | 705/64 |
| 2010/0071031 | A1* | 3/2010 | Carter | G06F 21/32 |
| | | | | 726/2 |
| 2011/0119759 | A1* | 5/2011 | McKeeth | G06F 21/36 |
| | | | | 726/19 |
| 2012/0030083 | A1* | 2/2012 | Newman | G06Q 40/00 |
| | | | | 705/35 |
| 2012/0237092 | A1* | 9/2012 | Bechtel | G06V 40/13 |
| | | | | 382/126 |
| 2013/0263226 | A1* | 10/2013 | Sudia | H04L 63/08 |
| | | | | 726/4 |
| 2014/0046848 | A1* | 2/2014 | Radu | G06Q 10/00 |
| | | | | 705/44 |
| 2017/0178131 | A1* | 6/2017 | Fernandez | G06Q 20/10 |
| 2019/0065714 | A1* | 2/2019 | Adams | G06F 21/32 |
| 2020/0167790 | A1* | 5/2020 | Newman | H04W 4/021 |
| 2020/0380495 | A1* | 12/2020 | Kang | G06Q 20/4097 |
| 2020/0410845 | A1* | 12/2020 | Alexander | G08B 25/14 |
| 2022/0215393 | A1* | 7/2022 | Lenkala | G06Q 20/4015 |
| 2023/0306420 | A1* | 9/2023 | Kurani | G06Q 20/36 |
| 2023/0316284 | A1* | 10/2023 | Kramme | G06Q 20/405 |
| | | | | 705/44 |

\* cited by examiner

COMPUTATIONALLY EFFICIENT THEFT DETECTION

BACKGROUND

Generally, theft is detected based on fraud algorithms that are trained on large sets of information. For example, the algorithms may use location information, merchant information, total amounts, behavioral information, and/or additional information to attempt to determine when an action is inconsistent with a pattern of a particular user.

SUMMARY

Some implementations described herein relate to a system for computationally efficient theft detection. The system may include one or more memories and one or more processors communicatively coupled to the one or more memories. The one or more processors may be configured to receive, from a front-end device, a request including an indication of a physical identifier associated with a user. The one or more processors may be further configured to determine that the physical identifier is associated with an indication of theft. The one or more processors may be configured to transmit the indication of theft to one or more backend servers associated with the user. The one or more processors may be further configured to store a deactivation in association with one or more account identifiers, that are associated with the user, according to a setting associated with the user, where one or more additional account identifiers, that are associated with the user, remain activated. The one or more processors may be configured to transmit a one-time authorization to the front-end device. The one or more processors may be further configured to store an indication not to authorize an additional request including the indication of the physical identifier.

Some implementations described herein relate to a method of computationally efficient theft detection. The method may include receiving, from a front-end device, a request including an indication of a physical identifier associated with a user. The method may further include determining that the physical identifier is associated with an indication of theft. The method may include transmitting the indication of theft to one or more backend servers associated with the user. The method may further include transmitting, to a user device, a coded message indicating theft, wherein the coded message is sent using a communication method consistent with a setting associated with the user. The method may include transmitting a one-time authorization to the front-end device. The method may further include storing an indication not to authorize an additional request including the indication of the physical identifier.

Some implementations described herein relate to a non-transitory computer-readable medium that stores a set of instructions for computationally efficient theft detection for a device. The set of instructions, when executed by one or more processors of the device, may cause the device to receive, from a front-end device, a request including an indication of a physical identifier associated with a user. The set of instructions, when executed by one or more processors of the device, may further cause the device to determine that the physical identifier is associated with an indication of theft. The set of instructions, when executed by one or more processors of the device, may cause the device to transmit the indication of theft to one or more backend servers associated with the user. The set of instructions, when executed by one or more processors of the device, may further cause the device to store a deactivation in association with one or more account identifiers that are associated with the user. The set of instructions, when executed by one or more processors of the device, may cause the device to transmit a denial of authorization to the front-end device.

DETAILED DESCRIPTION

The following detailed description of example implementations refers to the accompanying drawings. The same reference numbers in different drawings may identify the same or similar elements.

Trying to automatically detect theft is, in general, computationally costly. Complex fraud algorithms, often trained on large sets of information, are executed on servers and consume memory, processing resources, and power on those servers. Additionally, fraud algorithms usually trigger some false positives. False positives also waste computing and networking resources because user devices consume power and processing resources to transmit indications that theft has not occurred to the servers in response to the false positives.

Some implementations described herein relate to using a physical identifier, associated with a spoof identifier of a user, that, when used at a front-end device, automatically allows a backend server and/or a middleman server to detect that theft has occurred. This process does not result in false positives because the user knows not to use the physical identifier associated with the spoof identifier. As a result, computing and networking resources are conserved that otherwise would have been used to respond to false positives. Additionally, the backend server and/or the middleman server are able to detect theft using significantly less memory, power, and processing resources as compared with using fraud algorithms.

FIGS. 1A-1D are diagrams of an example 100 associated with computationally efficient theft detection at a backend server. As shown in FIGS. 1A-1D, example 100 includes a front-end device, a middleman server, a backend server, and a user device. These devices are described in more detail in connection with FIGS. 4 and 5.

Figure 1A:
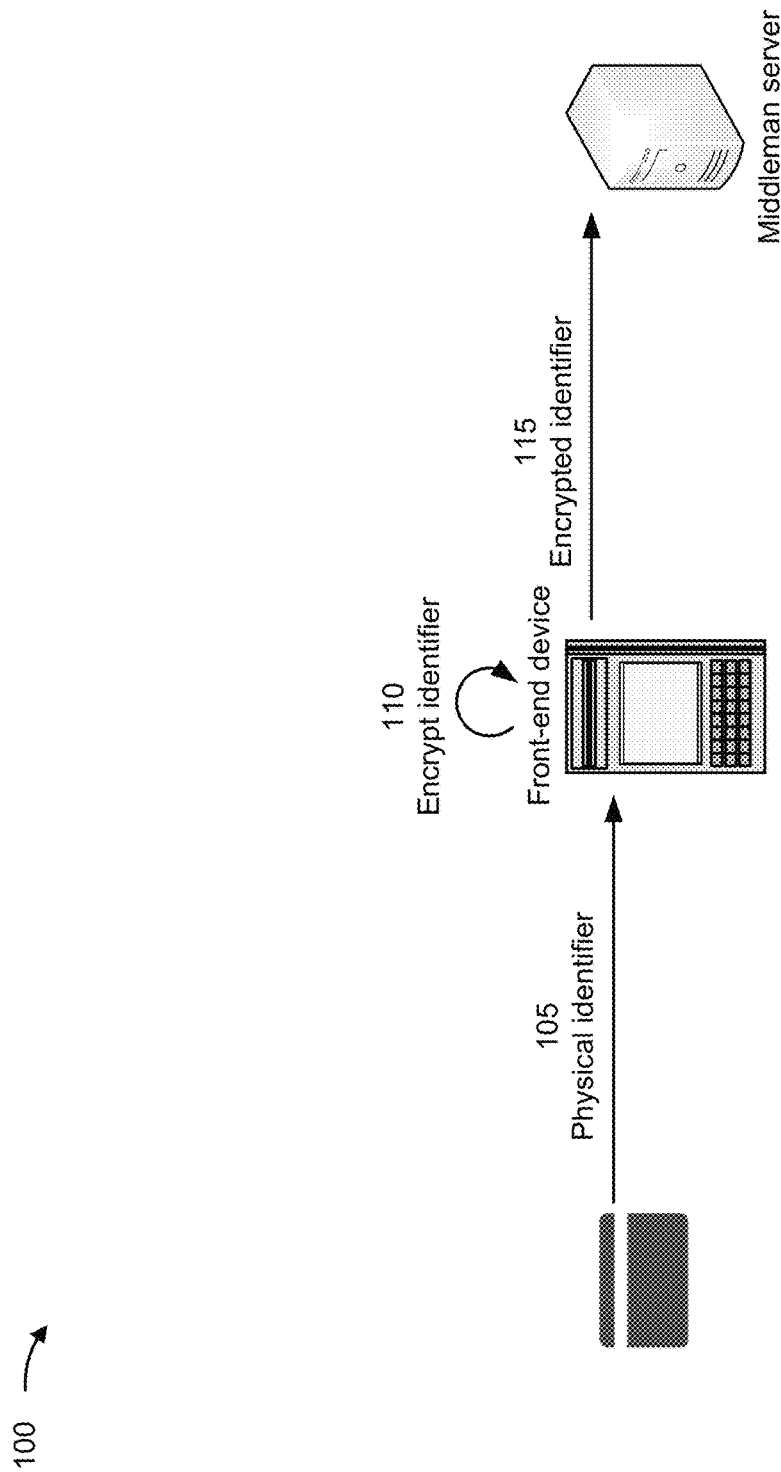
FIGS. 1A-1D are diagrams of an example implementation relating to computationally efficient theft detection at a backend server.

As shown in FIG. 1A and by reference number 105, the front-end device may receive a physical identifier associated with a user. The physical identifier may include a card associated with the user (e.g., with a magnetic stripe, a barcode, a chip, and/or another portion that the front-end device uses to generate the digital representation), a fingerprint and/or other type of biometric identifier associated with the user, and/or another physical object associated with the user from which the front-end device may generate a digital representation.

Accordingly, the front-end device may generate an indication of the physical identifier. In some implementations, the front-end device may receive the physical identifier and generate a digital representation of the physical identifier. For example, the front-end device may generate a digital representation of a name (e.g., in a string format), an account number (e.g., in an integer format), and/or another type of digital data based on the physical identifier. Additionally, in some implementations and as shown by reference number 110, the front-end device may generate the indication of the physical identifier as an encrypted representation of the physical identifier. For example, the front-end device may generate a hash and/or another encrypted version of the digital representation of the physical identifier. In some implementations, the front-end device may use a public key provided by the middleman server and/or the backend server to generate the encrypted representation.

As shown by reference number 115, the front-end device may transmit, and the middleman server may receive, the encrypted indication of the physical identifier. For example, the front-end device may transmit the encrypted indication of the physical identifier to the middleman server as an argument to an application programming interface (API) that is accessible via a network. In some implementations, the front-end device may determine the middleman server to which to transmit the data based on a form, a pattern, and/or content of the digital representation and a mapping of different digital representation forms, patterns, and/or content to different server identifiers (e.g., Internet protocol (IP) addresses and/or other identifiers). Alternatively, the middleman server may perform the routing to further middleman servers and/or to backend servers (e.g., one or more backend servers) based on a form, a pattern, and/or content of the digital representation.

In some implementations, the front-end device may transmit, and the middleman server may receive, a request including the indication of the physical identifier associated with the user. For example, the front-end device may transmit a request to modify an account associated with the user (e.g., by performing a transaction using the account) based on the physical identifier.

Although described above using a single indication of the physical identifier, the front-end device may generate (and encrypt) a plurality of digital representations associated with the physical identifier. For example, the front-end device may generate (and encrypt) digital representations of a name, an account number, an expiry date, a security code, and/or other information associated with the physical identifier.

Figure 1B:
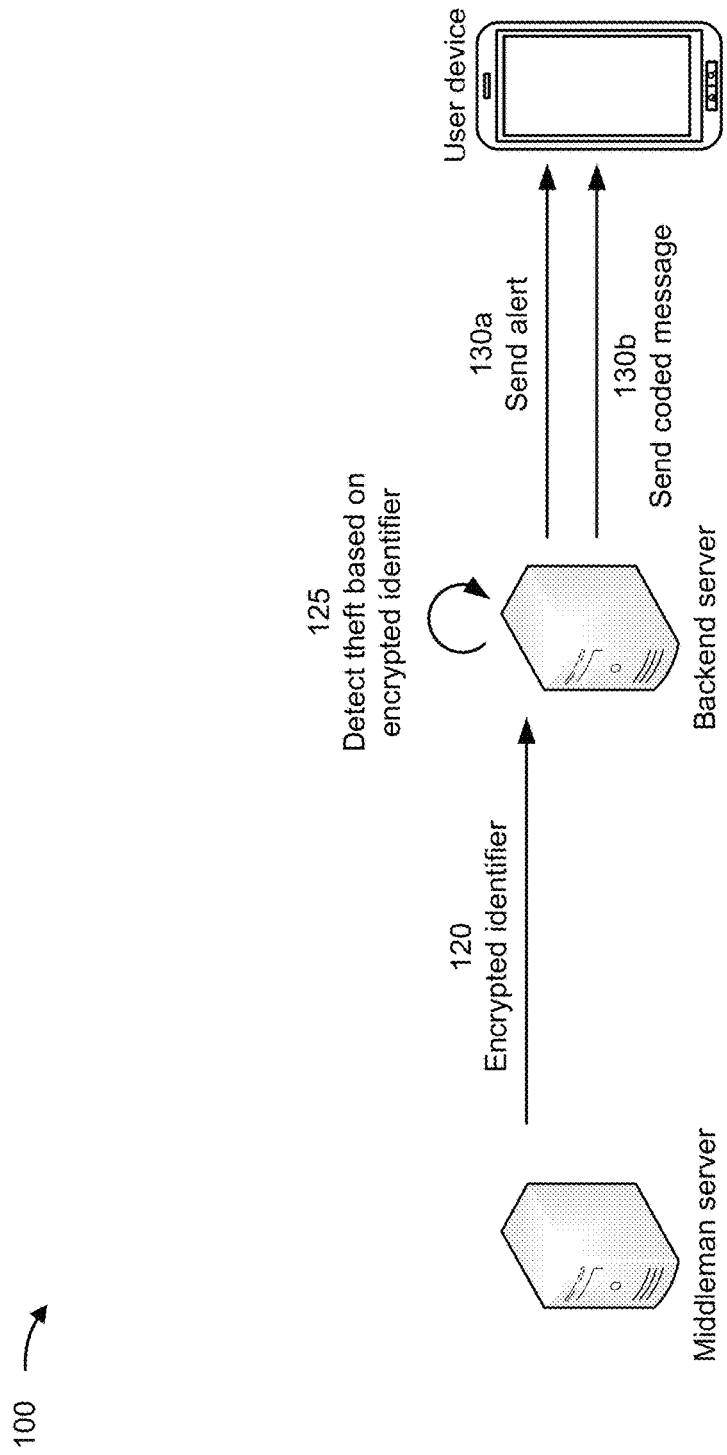

As shown by FIG. 1B and by reference number 120, the middleman server may transmit, and the backend server may receive, the encrypted indication of the physical identifier. For example, the middleman server may forward the request, from the front-end device, including the indication of the physical identifier associated with the user. Alternatively, the middleman server may generate a request, including the indication of the physical identifier associated with the user, including or otherwise based on information included in the request from the front-end device.

In some implementations, the middleman server may transmit the encrypted indication of the physical identifier to the backend server as an argument to an API that is accessible via a network. In some implementations, the middleman server may determine the backend server to which to transmit the data based on a form, a pattern, and/or content of the digital representation and a mapping of different digital representation forms, patterns, and/or content to different server identifiers (e.g., IP addresses and/or other identifiers). Alternatively, the backend server may perform the routing to further backend servers based on a form, a pattern, and/or content of the digital representation.

Accordingly, as shown by reference number 125, the backend server may determine that the physical identifier is associated with an indication of theft. For example, the backend server may map data representing the physical identifier (e.g., the encrypted indication of the physical identifier) to the indication of theft using a database (or another similar data structure) of identifiers associated with a plurality of users, including the user. The database may have been received at the backend server (e.g., from other backend servers) and/or generated at the backend server based on information gathered from other backend servers.

Additionally, or alternatively, the backend server may have generated an account identifier associated with the physical identifier, where the account identifier is a spoof identifier associated with the user. As a result, the backend server may have generated the database based, at least in part, on the backend server's generation of the spoof identifier. In some implementations, the backend server may generate the spoof identifier based on a request from the user device associated with the user (e.g., transmitted during a registration procedure, such as the procedure described in connection with FIGS. 3A-3B).

Based on determining that the physical identifier is associated with the indication of theft, and as shown by reference number 130a, the backend server may transmit, and the user device may receive, an alert indicating theft. For example, the backend server may transmit a text message (e.g., via an interface with a wireless network, such as a long term evolution (LTE) or Fifth Generation (5G) network), transmit an email (e.g., via an interface with a server providing email services), make an automated telephone call (e.g., via the interface with the wireless network), transmit a push notification (e.g., via an interface with an application layer that maintains a connection with an app on the user device), and/or otherwise transmit the alert to the user device.

Alternatively, as shown by reference number 130b, the backend server may transmit, and the user device may receive, a coded message indicating theft. For example, the coded message may be a message that implicitly indicates detection of theft. In some implementations, the coded message may include a sequence of numbers, a sequence of words, and/or another alphanumeric sequence that the user knows is indicative of theft but does not explicitly include the words "theft," "stolen," and other similar verbiage. The coded message may implicitly indicate detection of theft based on a setting associated with the user. For example, the user may indicate to the backend server, via the user device, the alphanumeric sequence to use (e.g., by providing the alphanumeric sequence or by selecting from a plurality of possible alphanumeric sequences). In some implementations, the setting is indicated during a registration procedure, such as the procedure described in connection with FIGS. 3A-3B.

Additionally, the backend server may send the coded message using a communication method consistent with a setting associated with the user. In some implementations, the setting may indicate which phone number, email address, and/or other communication technique to use to send the coded message. For example, the user may indicate to the backend server, via the user device, a home phone number or another phone number alternate to the user's cellular phone number, an email address that is not configured to trigger push notifications on the user's cellular device, and/or another communication technique that is not connected to the user's cellular device. As a result, the backend server may notify the user of the theft without alerting the thief that s/he has been caught because the thief is likely to have stolen the user's cellular device along with the physical identifier. In some implementations, the setting is indicated during a registration procedure, such as the procedure described in connection with FIGS. 3A-3B.

Figure 1C:
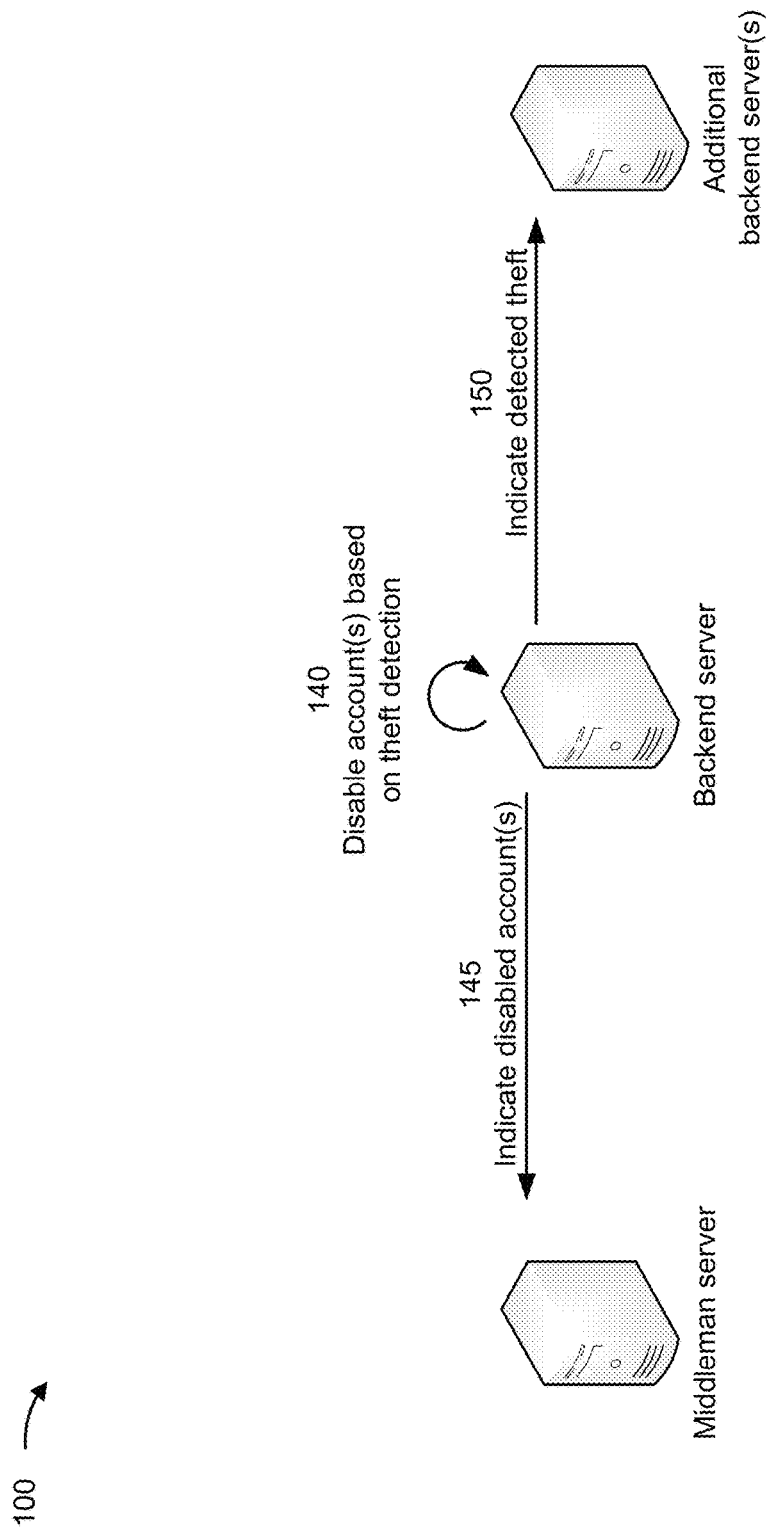

Alternatively, the middleman server may transmit the alert or the coded message to the user device. Furthermore, as shown in FIG. 1C and by reference number 140, the backend server may store a deactivation in association with account identifiers (e.g., one or more account identifiers) that are associated with the user. Accordingly, based on determining that the physical identifier is associated with the indication of theft, the backend server may prevent future transactions from being authorized using the account identifiers. In some implementations, the backend server may deactivate the account identifiers according to a setting associated with the user. For example, the setting may indicate which account identifiers, of a set of account identifiers associated with the user and the backend server, should be deactivated when the backend server detects theft based on the spoof identifier. In some implementations, the setting is indicated during a registration procedure, such as the procedure described in connection with FIGS. 3A-3B.

In some implementations, additional account identifiers (e.g., one or more additional account identifiers) that are associated with the user remain activated. In some implementations, the backend server may leave the additional account identifiers activated according to a setting associated with the user. For example, the user may indicate to the backend server, via the user device, additional account identifiers associated with additional physical identifiers that the user does not typically carry on him/her. As a result, the backend server may keep some account identifiers, associated with the user, activated without incurring risk of fraudulent transactions. In some implementations, the setting is indicated during a registration procedure, such as the procedure described in connection with FIGS. 3A-3B.

In some implementations, and as shown by reference number 145, the backend server may transmit, and the middleman server may receive, an indication of the deactivation of the account identifiers that are associated with the user. Accordingly, the middleman server may decline future requests, associated with the account identifiers, without contacting the backend server. As a result, processing resources and power are conserved at the middleman server and the backend server, as well as network resources between the middleman server and the backend server.

Additionally, or alternatively, and as shown by reference number 150, the backend server may transmit, and an additional backend server (e.g., one or more additional backend servers) associated with the user may receive, the indication of theft. As a result, the additional backend server may store a deactivation in association with account identifiers (e.g., one or more account identifiers) that are associated with the user and the additional backend server. Accordingly, based on determining that the physical identifier is associated with the indication of theft, the backend server may help the additional backend server prevent future transactions from being authorized using the account identifiers that are associated with the user and the additional backend server. As a result, power and processing resources are conserved at the additional backend server because the additional backend server does not have to separately detect theft.

In some implementations, the additional backend server may deactivate the account identifiers according to a setting associated with the user. For example, the setting may indicate which account identifiers, of a set of account identifiers associated with the user and the additional backend server, should be deactivated when the additional backend server receives the indication of theft. In some implementations, the setting is indicated during a registration procedure, such as the procedure described in connection with FIGS. 3A-3B.

In some implementations, the backend server may transmit the indication of theft to the additional backend server according to a setting associated with the user. For example, the setting may indicate the additional backend server to which the indication of theft should be transmitted. In some implementations, the setting is indicated during a registration procedure, such as the procedure described in connection with FIGS. 3A-3B. In some implementations, the user device may transmit credentials (e.g., a username and password, a passcode, a personal identification number (PIN), a certificate, a token, biometric information, and/or similar authentication information) to the backend server to permit the backend server to transmit the indication of theft to the additional backend server.

Figure 1D:
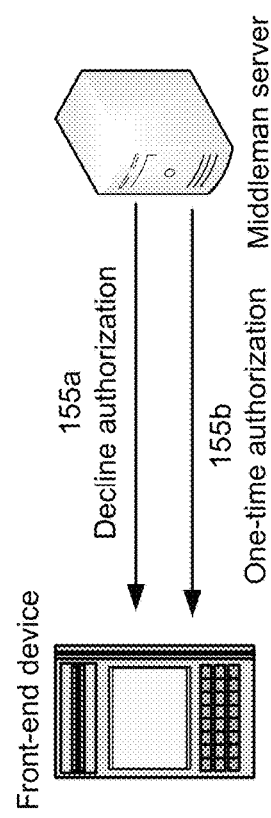

Furthermore, as shown in FIG. 1D and by reference number 155a, the middleman server may transmit, and the front-end device may receive, a denial of authorization based on the backend server determining that the physical identifier is associated with the indication of theft. For example, the backend server may transmit a denial to the middleman server, and the middleman server may transmit, in turn, the denial to the front-end device. Alternatively, the backend server may transmit the indication of the deactivation of the account identifiers that are associated with the user to the middleman server (e.g., as described in connection with reference number 145), and the middleman server may determine to deny authorization based on the indication of the deactivation received from the backend server.

As an alternative, and as shown by reference number 155b, the middleman server may transmit, and the front-end device may receive, a one-time authorization. As a result, the backend server and/or the middleman server may refrain from alerting the thief that s/he has been caught because the thief is more likely to be caught if s/he is tracked for longer.

In some implementations, the backend server may transmit a one-time authorization to the middleman server, and the middleman server transmits, in turn, the one-time authorization to the front-end device. Alternatively, the backend server may transmit the indication of the deactivation of the account identifiers that are associated with the user to the middleman server (e.g., as described in connection with reference number 145), and the middleman server may determine to permit a one-time authorization. The middleman server and/or the backend server may determine to permit a one-time authorization when an amount associated with the request from the front-end device satisfies a threshold.

Accordingly, the middleman server and/or the backend server may store an indication not to authorize an additional request including the indication of the physical identifier. As a result, power and processing resources are conserved because the backend server and/or the middleman server do not have to detect theft again for the additional request.

In some implementations, a location, a date, a time, a merchant identifier, and/or another property associated with the request from the front-end device may be used to train a fraud model. For example, the fraud model may determine that a geographic area and/or a particular merchant are associated with high rates of fraud based on the indication of theft. Accordingly, the middleman server and/or the backend server may automatically decline additional requests from the front-end device in order to conserve power and processing resources because the backend server and/or the middleman server do not have to detect theft again for the additional requests.

By using techniques as described in connection with FIGS. 1A-1D, the physical identifier, associated with the spoof identifier, allows the backend server to automatically detect that theft has occurred. As a result, false positives are reduced, and computing and networking resources are conserved that otherwise would have been used to respond to false positives. Additionally, the backend server is able to detect theft using significantly less memory, power, and processing resources as compared with using fraud algorithms.

As indicated above, FIGS. 1A-1D are provided as an example. Other examples may differ from what is described with regard to FIGS. 1A-1D.

Figure 2A:
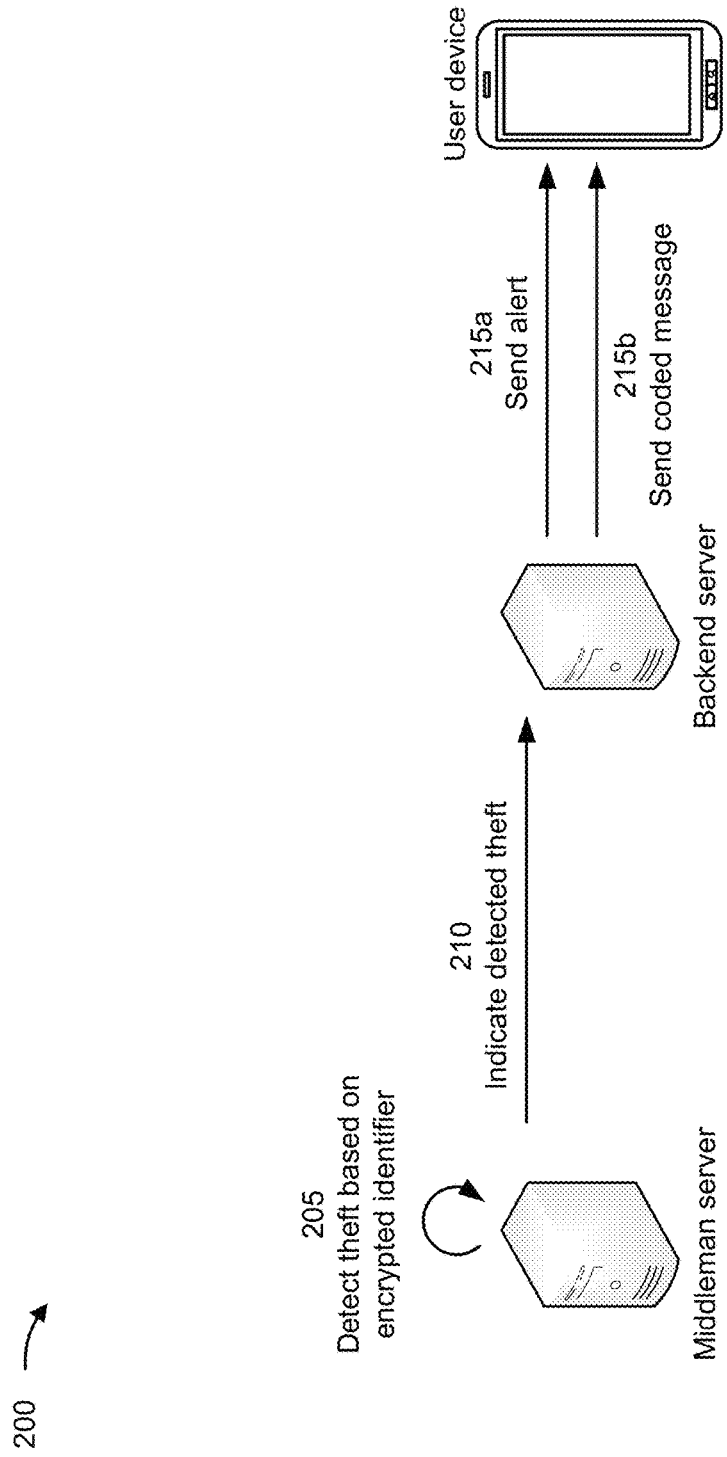
FIGS. 2A-2B are diagrams of an example implementation relating to computationally efficient theft detection at a middleman server.
Figure 2B:
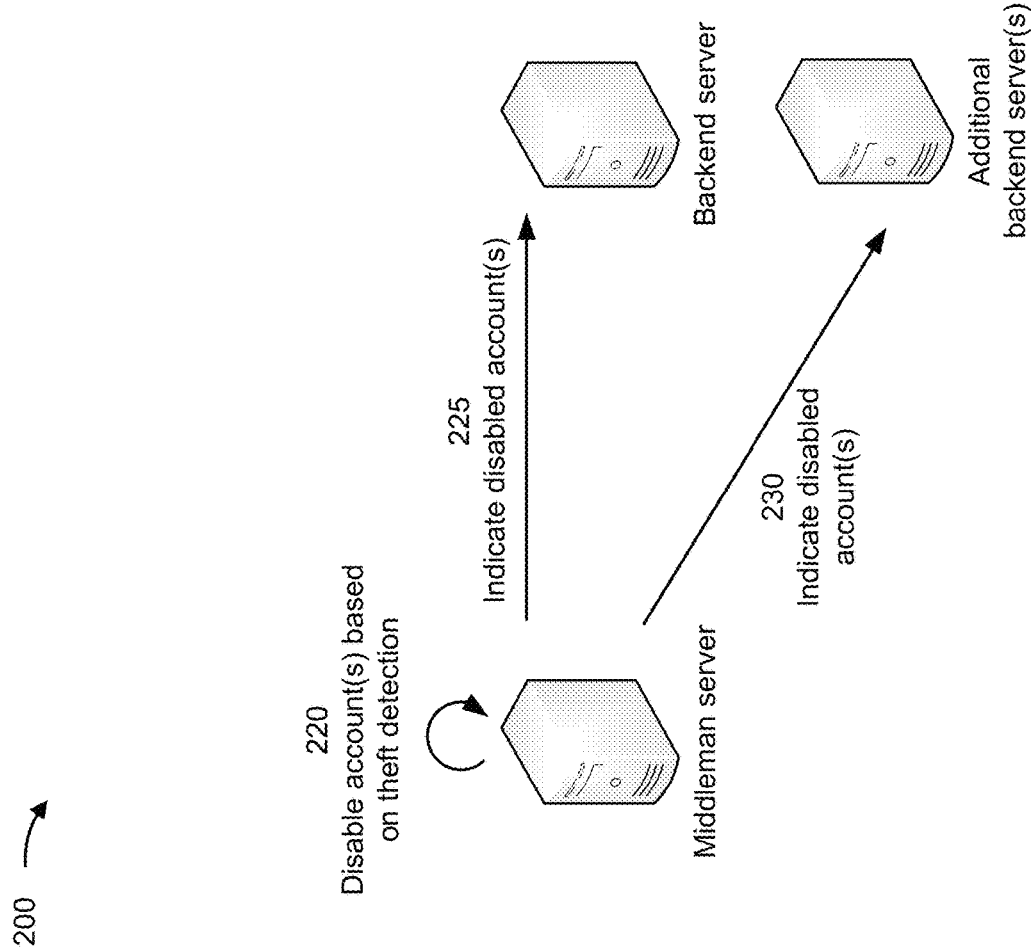

FIGS. 2A-2B are diagrams of an example 200 associated with computationally efficient theft detection at a middleman server. As shown in FIGS. 2A-2B, example 200 includes a middleman server, a backend server, and a user device. These devices are described in more detail in connection with FIGS. 4 and 5.

As described in connection with reference numbers 105, 110, and 115 of FIG. 1A, a front-end device may receive a physical identifier associated with a user, generate an indication of the physical identifier as an encrypted representation of the physical identifier, and transmit the encrypted indication of the physical identifier to the middleman server.

Accordingly, as shown in FIG. 2A and by reference number 205, the middleman server may determine that the physical identifier is associated with an indication of theft. For example, the middleman server may map data representing the physical identifier (e.g., the encrypted indication of the physical identifier) to the indication of theft using a database (or another similar data structure) of identifiers associated with a plurality of users, including the user. The database may have been received at the middleman server (e.g., from one or more backend servers) and/or generated at the middleman server based on information gathered from backend servers.

Additionally, or alternatively, the middleman server may have generated an account identifier associated with the physical identifier, where the account identifier is a spoof identifier associated with the user. As a result, the middleman server may have generated the database based, at least in part, on the middleman server's generation of the spoof identifier. In some implementations, the middleman server may generate the spoof identifier based on a request from the user device associated with the user (e.g., transmitted during a registration procedure, such as the procedure described in connection with FIGS. 3A-3B).

Additionally, as shown by reference number 210, the middleman server may transmit, and a backend server (e.g., one or more backend servers) associated with the user may receive, the indication of theft. As a result, the backend server may store a deactivation in association with account identifiers (e.g., one or more account identifiers) that are associated with the user and the backend server. Accordingly, based on determining that the physical identifier is associated with the indication of theft, the middleman server may help the backend server prevent future transactions from being authorized using the account identifiers that are associated with the user and the backend server. As a result, power and processing resources are conserved at the backend server because the backend server does not have to separately detect theft.

In some implementations, the backend server may deactivate the account identifiers according to a setting associated with the user. For example, the setting may indicate which account identifiers, of a set of account identifiers associated with the user and the backend server, should be deactivated when the backend server receives the indication of theft. In some implementations, the setting is indicated during a registration procedure, such as the procedure described in connection with FIGS. 3A-3B.

In some implementations, the middleman server may transmit the indication of theft to the backend server according to a setting associated with the user. For example, the setting may indicate the backend server to which the indication of theft should be transmitted. In some implementations, the setting is indicated during a registration procedure, such as the procedure described in connection with FIGS. 3A-3B. In some implementations, the user device may transmit credentials (e.g., a username and password, a passcode, a PIN, a certificate, a token, biometric information, and/or similar authentication information) to the middleman server to permit the middleman server to transmit the indication of theft to the backend server.

As further shown in FIG. 2A and by reference number 215a, the backend server may transmit, and the user device may receive, an alert indicating theft. For example, the backend server may transmit the alert as described in connection with reference number 130a of FIG. 1B. Alternatively, and as shown by reference number 215b, the backend server may transmit, and the user device may receive, a coded message indicating theft. For example, the backend server may transmit the coded message as described in connection with reference number 130b of FIG. 1B. Alternatively, the middleman server may transmit the alert or the coded message to the user device.

Furthermore, as shown in FIG. 2B and by reference number 220, the middleman server may store a deactivation in association with account identifiers (e.g., one or more account identifiers), that are associated with the user. Accordingly, based on determining that the physical identifier is associated with the indication of theft, the backend server may prevent future transactions from being authorized using the account identifiers. As a result, the middleman server conserves network resources that would otherwise have been used to transmit information associated with the future transactions to the backend server for denial.

In some implementations, the middleman server may deactivate the account identifiers according to a setting associated with the user. For example, the setting may indicate which account identifiers, of a set of account identifiers associated with the user and the backend server, should be deactivated when the backend server detects theft based on the spoof identifier. In some implementations, the setting is indicated during a registration procedure, such as the procedure described in connection with FIGS. 3A-3B.

In some implementations, additional account identifiers (e.g., one or more additional account identifiers) that are associated with the user remain activated. In some implementations, the middleman server may leave the additional account identifiers activated according to a setting associated with the user. For example, the user may indicate to the middleman server, via the user device, additional account identifiers associated with additional physical identifiers that the user does not typically carry on him/her. As a result, the middleman server may keep some account identifiers, associated with the user, activated without incurring risk of fraudulent transactions. In some implementations, the setting is indicated during a registration procedure, such as the procedure described in connection with FIGS. 3A-3B.

As shown by reference number 225, the middleman server may transmit, and the backend server may receive, an indication of the deactivation of the account identifiers that are associated with the user. Accordingly, the backend server may decline future requests associated with the account identifiers (e.g., from a different middleman server that is not aware of the deactivation).

Additionally, or alternatively, and as shown by reference number 230, the middleman server may transmit, and an additional backend server (e.g., one or more additional backend servers) associated with the user may receive, the indication of theft. As a result, the additional backend server may store a deactivation in association with account identifiers (e.g., one or more account identifiers) that are associated with the user and the additional backend server. Accordingly, based on determining that the physical identifier is associated with the indication of theft, the backend server may help the additional backend server prevent future transactions from being authorized using the account identifiers that are associated with the user and the additional backend server. As a result, power and processing resources are conserved at the additional backend server because the additional backend server does not have to separately detect theft.

In some implementations, the additional backend server may deactivate the account identifiers according to a setting associated with the user. For example, the setting may indicate which account identifiers, of a set of account identifiers associated with the user and the additional backend server, should be deactivated when the additional backend server receives the indication of theft. In some implementations, the setting is indicated during a registration procedure, such as the procedure described in connection with FIGS. 3A-3B.

In some implementations, the middleman server may transmit the indication of theft to the additional backend server according to a setting associated with the user. For example, the setting may indicate the additional backend server to which the indication of theft should be transmitted. In some implementations, the setting is indicated during a registration procedure, such as the procedure described in connection with FIGS. 3A-3B. In some implementations, the user device may transmit credentials (e.g., a username and password, a passcode, a PIN, a certificate, a token, biometric information, and/or similar authentication information) to the middleman server to permit the middleman server to transmit the indication of theft to the additional backend server.

Furthermore, as described in connection with reference number 155a of FIG. 1D, the middleman server may transmit, and the front-end device may receive, a denial of authorization based on the backend server determining that the physical identifier is associated with the indication of theft. As an alternative, and as described in connection with reference number 155b of FIG. 1D, the middleman server may transmit, and the front-end device may receive, a one-time authorization. As a result, the backend server and/or the middleman server may refrain from alerting the thief that s/he has been caught because the thief is more likely to be caught if s/he is tracked for longer. In some implementations, the middleman server and/or the backend server may determine to permit a one-time authorization when an amount associated with the request from the front-end device satisfies a threshold.

By using techniques as described in connection with FIGS. 2A-2B, the physical identifier, associated with the spoof identifier, allows the middleman server to automatically detect that theft has occurred. As a result, false positives are reduced, and computing and networking resources are conserved that otherwise would have been used to respond to false positives. Additionally, the middleman server is able to detect theft using significantly less memory, power, and processing resources as compared with using fraud algorithms.

As indicated above, FIGS. 2A-2B are provided as an example. Other examples may differ from what is described with regard to FIGS. 2A-2B.

Figure 3A:
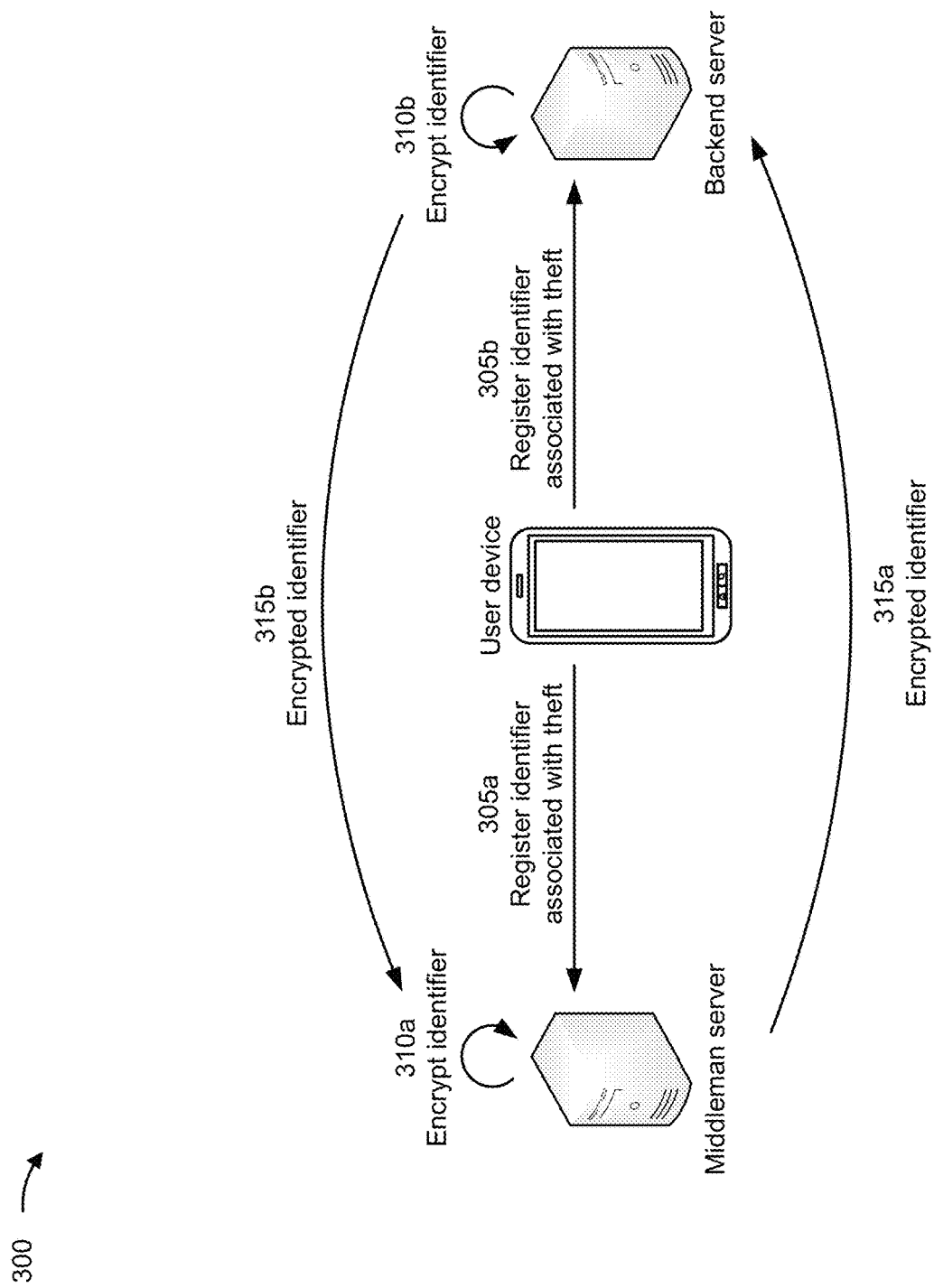
FIGS. 3A-3B are diagrams of an example implementation relating to registration for computationally efficient theft detection.
Figure 3B:
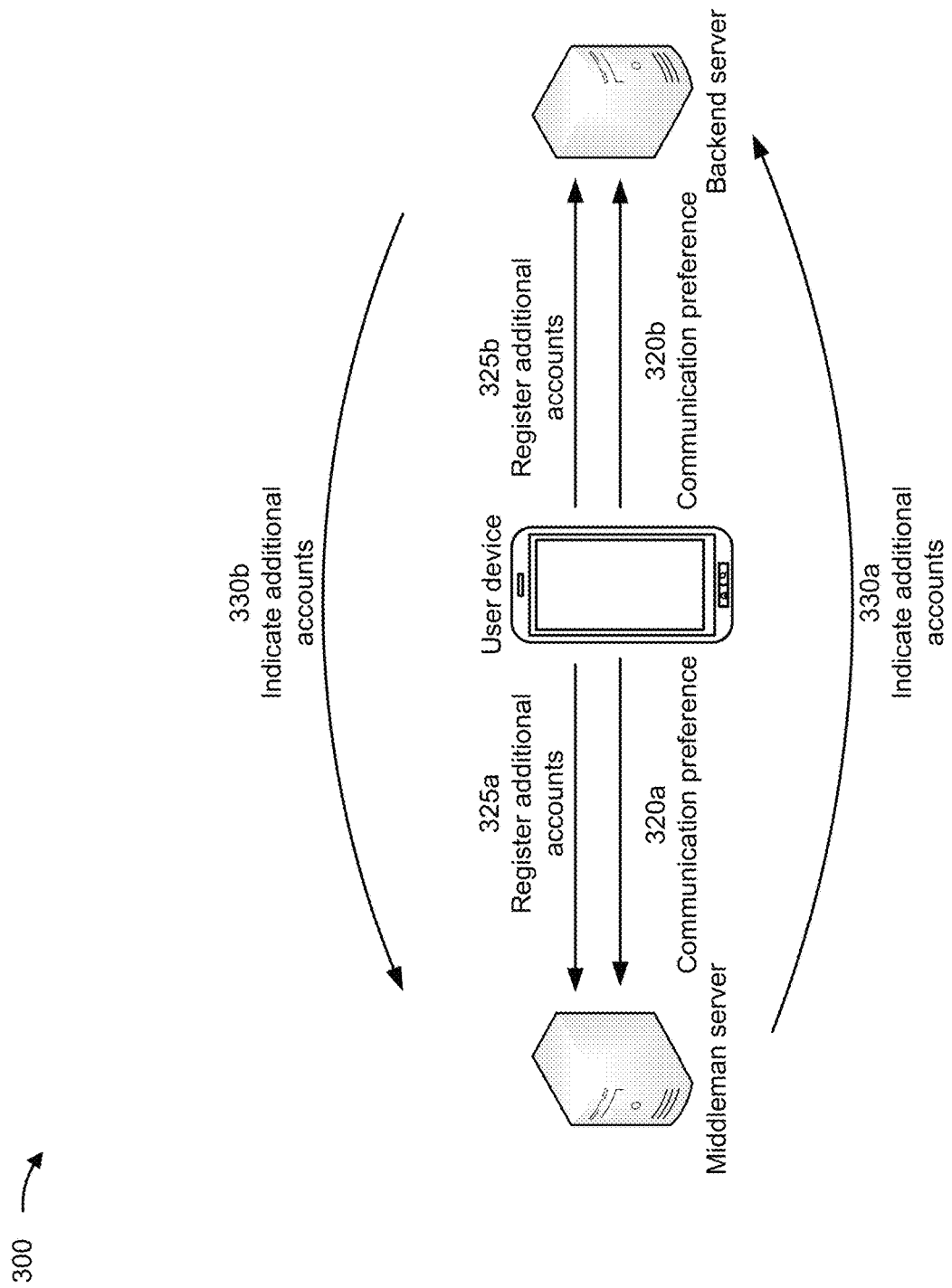

FIGS. 3A-3B are diagrams of an example 300 associated with registration for computationally efficient theft detection. As shown in FIGS. 3A-3B, example 300 includes a middleman server, a backend server, and a user device. These devices are described in more detail in connection with FIGS. 4 and 5.

As shown in FIG. 3A and by reference number 305a, the user device may transmit, and the middleman server may receive, a registration message associated with a physical identifier associated with theft (e.g., a physical identifier associated with a spoof identifier, as described herein). For example, a user may use the user device to traverse a website provided by the middleman server and submit a request to receive the physical identifier associated with theft. Additionally, or alternatively, the user may have received the physical identifier associated with theft and submit a request to activate the physical identifier to the middleman server. Accordingly, as shown by reference number 310a, the middleman server may encrypt a digital representation of the physical identifier and, as shown by reference number 315a, transmit the encrypted representation to a backend server associated with the user. As a result, the middleman server may generate the spoof identifier and inform the backend server to deny transaction requests associated with the spoof identifier.

Alternatively, and as shown by reference number 305b, the user device may transmit, and the backend server may receive, the registration message associated with the physical identifier associated with theft (e.g., a physical identifier associated with a spoof identifier, as described herein). For example, the user may use the user device to traverse a website provided by the backend server and submit a request to receive the physical identifier associated with theft. Additionally, or alternatively, the user may have received the physical identifier associated with theft and submit a request to activate the physical identifier to the backend server. Accordingly, as shown by reference number 310b, the backend server may encrypt a digital representation of the physical identifier and, as shown by reference number 315b, transmit the encrypted representation to a middleman server. As a result, the backend server may generate the spoof identifier and inform the middleman server to deny transaction requests associated with the spoof identifier.

As shown in FIG. 3B and by reference number 320a, the user device may additionally indicate a communication preference (e.g., as a setting) to the middleman server. For example, the user device may indicate a telephone number, an email address, and/or another communication method to use to alert the user when the physical identifier associated with theft is used. In some implementations, the middleman server may transmit an alphanumeric sequence to the indicated communication method such that the user device verifies the indicated communication method by entering the alphanumeric sequence.

Additionally, as shown by reference number 325a, the user device may indicate additional account identifiers (e.g., one or more additional account identifiers) to the middleman server. Accordingly, the middleman server may contact additional backend servers (e.g., as described in connection with FIG. 2B), based on detecting that the physical identifier associated with theft was used, based on the additional account identifiers. In some implementations, as shown by reference number 330a, the middleman server may indicate the additional account identifiers to the backend server. As a result, the middleman server may inform the backend server to deny transaction requests associated with the additional account identifiers based on an indication that the physical identifier associated with theft was used.

Alternatively, as shown by reference number 320b, the user device may indicate the communication preference (e.g., as a setting) to the backend server. Additionally, as shown by reference number 325b, the user device may indicate additional account identifiers (e.g., one or more additional account identifiers) to the backend server. Accordingly, the backend server may contact additional backend servers (e.g., as described in connection with FIG. 1C), based on detecting that the physical identifier associated with theft was used, based on the additional account identifiers. In some implementations, as shown by reference number 330b, the backend server may indicate the additional account identifiers to the middleman server. As a result, the backend server may inform the middleman server to deny transaction requests associated with the additional account identifiers based on an indication that the physical identifier associated with theft was used.

As indicated above, FIGS. 3A-3B are provided as an example. Other examples may differ from what is described with regard to FIGS. 3A-3B.

Figure 4:
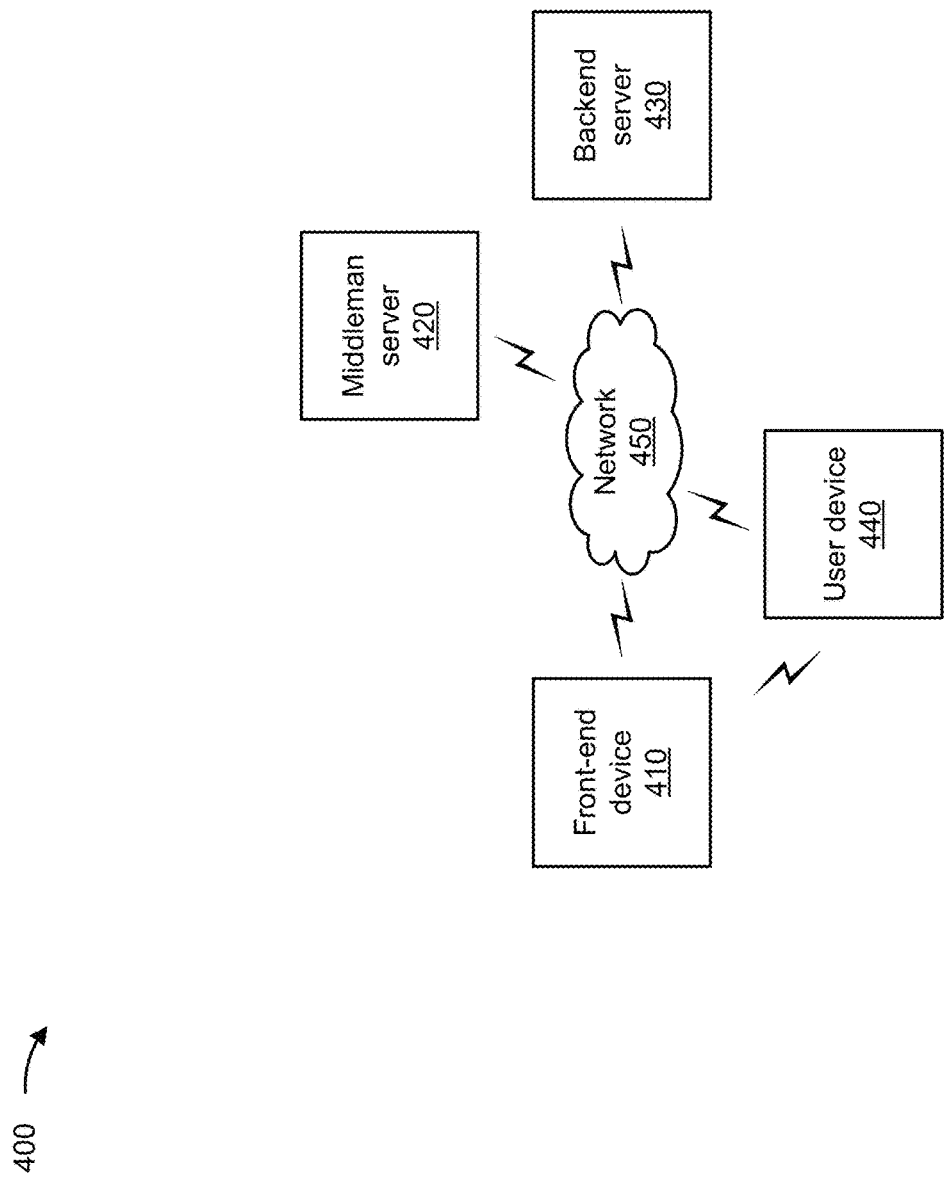
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a front-end device 410, a middleman server 420, a backend server 430, a user device 440, and/or a network 450. Devices of environment 400 may interconnect via wired connections and/or wireless connections.

The front-end device 410 includes one or more devices capable of facilitating an electronic transaction. For example, the front-end device 410 may include a PoS terminal, a payment terminal (e.g., a credit card terminal, a contactless payment terminal, a mobile credit card reader, or a chip reader), and/or an automated teller machine (ATM). In some implementations, the front-end device 410 includes an access control terminal (e.g., used to control physical access to a secure area), such as an access control panel used to control an access-controlled entry (e.g., a turnstile, a door, a gate, or another physical barrier). The front-end device 410 may include one or more output components to transmit information to a user. Example output components of the front-end device 410 include a display and/or one or more speakers. The front-end device 410 may further include one or more input components to facilitate obtaining data (e.g., account information) and/or to facilitate interaction with and/or authorization from the user. Example input components of the front-end device 410 include a number keypad, a touchscreen, a magnetic stripe reader, a chip reader, and/or a radio frequency (RF) signal reader (e.g., a near-field communication (NFC) reader).

The middleman server 420 includes one or more devices capable of processing, authorizing, and/or facilitating a transaction. For example, the middleman server 420 may include one or more servers and/or computing hardware (e.g., in a cloud computing environment or separate from a cloud computing environment) configured to receive and/or store information associated with processing an electronic transaction. The middleman server 420 may forward a transaction (e.g., to the backend server 430) for approval or declination and/or for completing the transaction if the transaction is approved. The middleman server 420 may forward the transaction based on information received from the front-end device 410, such as transaction data (e.g., information that identifies a transaction amount, a merchant, a time of a transaction, a location of the transaction, or the like), account information communicated to the front-end device 410, and/or information stored by the middleman server 420 (e.g., for fraud detection).

The middleman server 420 may be associated with a financial institution (e.g., a bank, a lender, a credit card company, or a credit union) and/or may be associated with a transaction card association that authorizes a transaction and/or facilitates a transfer of funds. For example, the middleman server 420 may be associated with an issuing bank, an acquiring bank (or merchant bank) associated with the merchant, and/or a transaction card association (e.g., VISA® or MASTERCARD®) associated with the middleman server 420. Based on receiving information from the front-end device 410, one or more devices of the middleman server 420 may communicate to a request to authorize a transaction to the backend server 430.

The backend server 430 includes one or more devices capable of processing, authorizing, and/or facilitating a transaction. For example, the backend server 430 may include one or more servers and/or computing hardware (e.g., in a cloud computing environment or separate from a cloud computing environment) configured to receive and/or store information associated with processing an electronic transaction. The backend server 430 may process a transaction, such as to approve (e.g., permit, authorize, or the like) or decline (e.g., reject, deny, or the like) the transaction and/or to complete the transaction if the transaction is approved. The backend server 430 may process the transaction based on information received from the middleman server 420, such as transaction data (e.g., information that identifies a transaction amount, a merchant, a time of a transaction, a location of the transaction, or the like), account information communicated to the middleman server 420, and/or information stored by the backend server 430 (e.g., for fraud detection).

The backend server 430 may be associated with a financial institution (e.g., a bank, a lender, a credit card company, or a credit union) and/or may be associated with a transaction card association that authorizes a transaction and/or facilitates a transfer of funds. For example, the backend server 430 may be associated with an issuing bank, an acquiring bank (or merchant bank) associated with the merchant, and/or a transaction card association (e.g., VISA® or MASTERCARD®) associated with the middleman server 420. Based on receiving information from the middleman server 420, one or more devices of the backend server 430 may communicate to authorize a transaction and/or to transfer funds from an account associated with the user to an account of an entity (e.g., a merchant) associated with the middleman server 420.

The user device 440 includes one or more devices capable of being used for an electronic transaction. The user device 440 may include a communication device and/or a computing device. For example, the user device 440 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the user device 440 may be capable of communicating with the front-end device 410, middleman server 420, and/or the backend server 430 via the network 450, as described elsewhere herein. Additionally, in some implementations, the user device 440 may be capable of communicating directly with the front-end device 410 (e.g., via NFC, Bluetooth® signals, universal serial bus (USB), and/or another type of short-range wireless or wired communication).

The network 450 includes one or more wired and/or wireless networks. For example, the network 450 may include a cellular network, a public land mobile network, a local area network, a wide area network, a metropolitan area network, a telephone network, a private network, the Internet, and/or a combination of these or other types of networks. The network 450 enables communication among the devices of environment 400. In some implementations, the middleman server 420 and/or the backend server 430 may communicate with the front-end device 410 using a first network (e.g., a wired network) and may communicate with the user device 440 using a second network (e.g., a wireless network).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
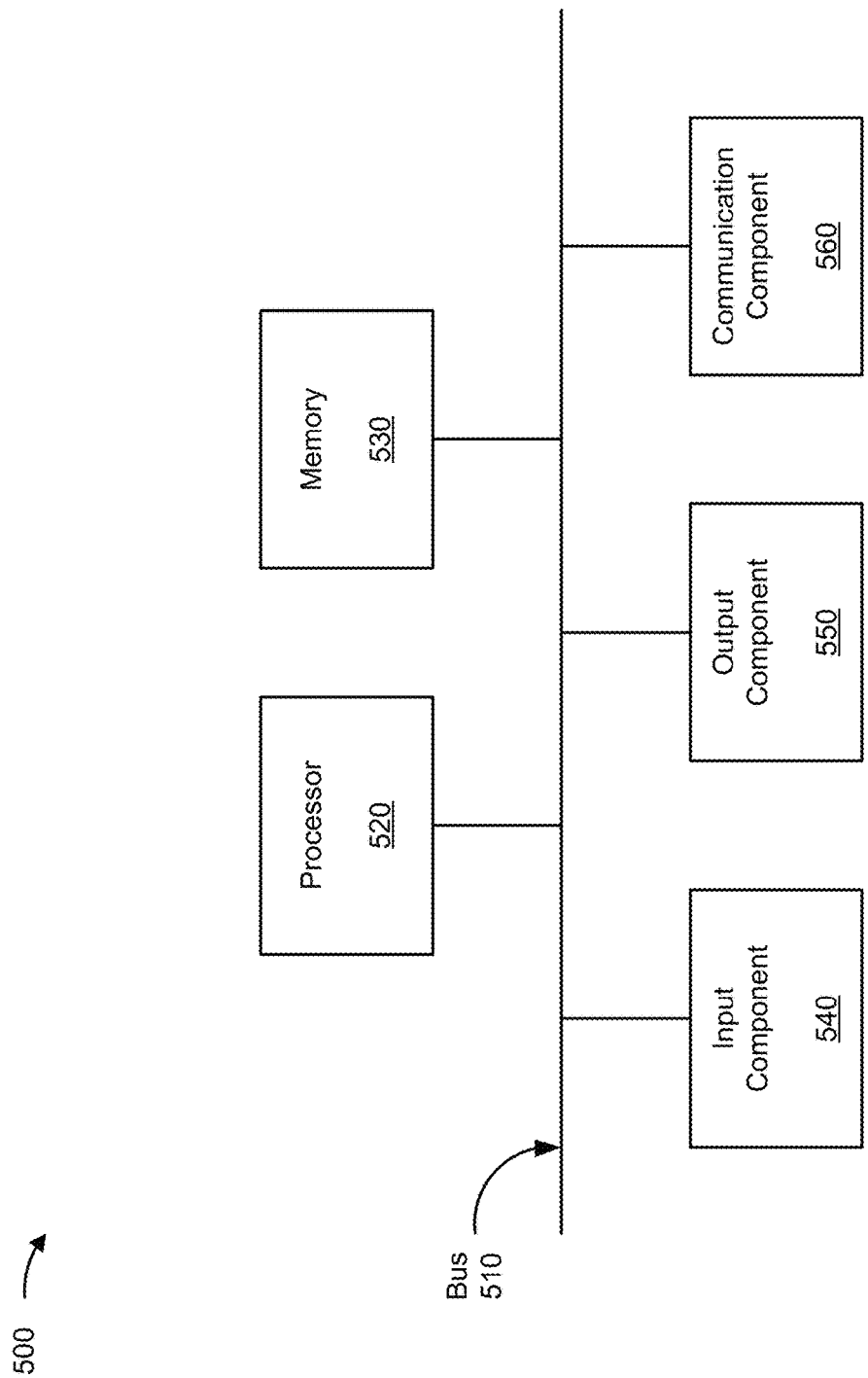
FIG. 5 is a diagram of example components of one or more devices of FIG. 4.

FIG. 5 is a diagram of example components of a device 500, which may correspond to a front-end device, a middleman server, a backend server, and/or a user device. In some implementations, a front-end device, a remote server, and/or a user device include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
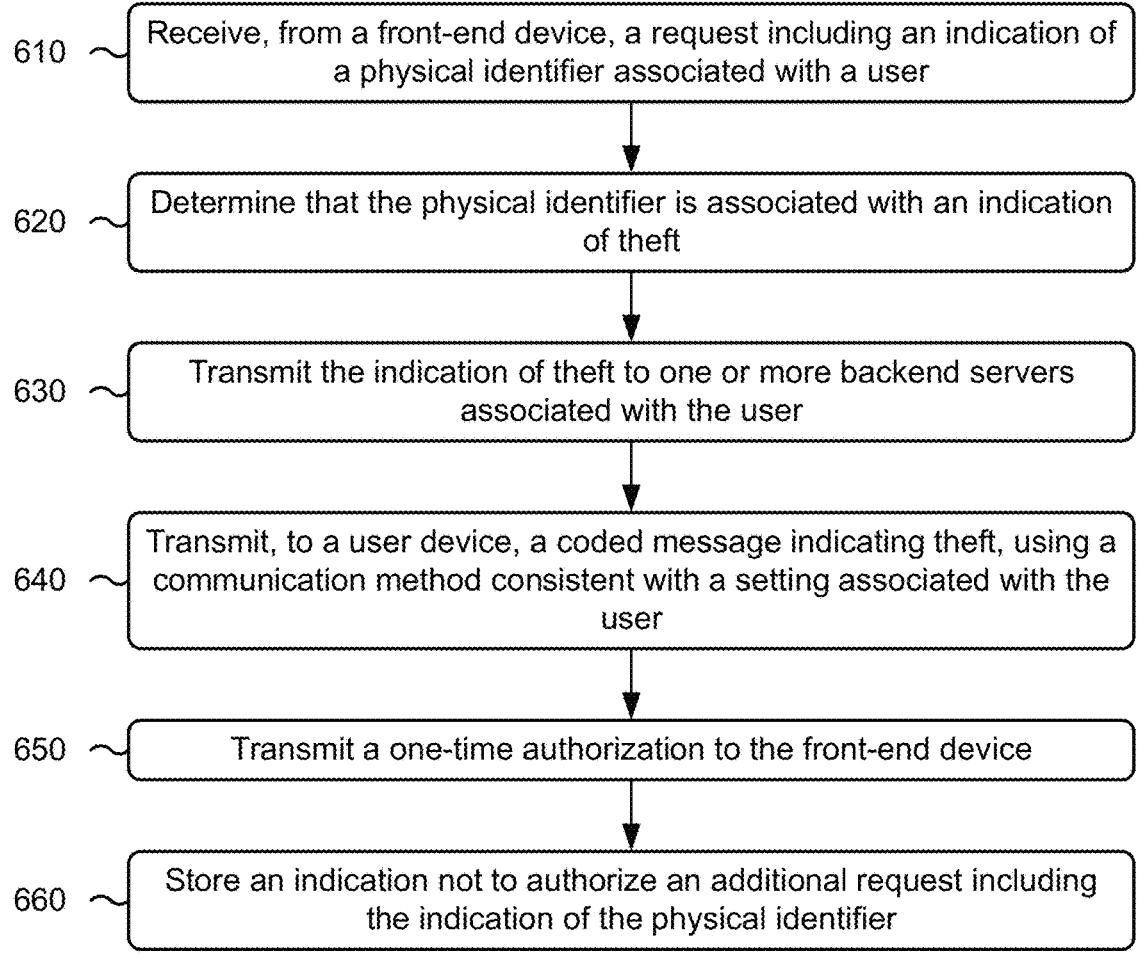
FIG. 6 is a flowchart of an example process relating to computationally efficient theft detection.

FIG. 6 is a flowchart of an example process 600 associated with computationally efficient theft detection. In some implementations, one or more process blocks of FIG. 6 may be performed by a device (e.g., middleman server 420 and/or backend server 430). In some implementations, one or more process blocks of FIG. 6 may be performed by another device or a group of devices separate from or including the device, such as front-end device 410 and/or user device 440. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, from a front-end device, a request including an indication of a physical identifier associated with a user (block 610). As further shown in FIG. 6, process 600 may include determining that the physical identifier is associated with an indication of theft (block 620). In some implementations, as further shown in FIG. 6, process 600 may include transmitting the indication of theft to one or more backend servers associated with the user (block 630). As further shown in FIG. 6, process 600 may include transmitting, to a user device, a coded message indicating theft, where the coded message is sent using a communication method consistent with a setting associated with the user (block 640). As further shown in FIG. 6, process 600 may include transmitting a one-time authorization to the front-end device (block 650). Therefore, as further shown in FIG. 6, process 600 may include storing an indication not to authorize an additional request including the indication of the physical identifier (block 660). Alternatively, process 600 may include transmitting a denial of authorization to the front-end device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIGS. 1A-1C, 2A-2B, and/or 3A-3B.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for computationally efficient theft detection, the system comprising:
   one or more memories; and
   one or more processors, coupled to the one or more memories, configured to:
      receive, from a front-end device, a request including an indication of a physical identifier associated with a user;
      determine, using a fraud model, that the physical identifier is associated with an indication of theft;
      receive, from a user device, one or more credentials corresponding to one or more backend servers associated with the user, wherein the one or more credentials permit transmittal of the indication of theft to the one or more backend servers;
      transmit the indication of theft to the one or more backend servers;
      store a deactivation in association with one or more account identifiers, that are associated with the user, according to a setting associated with the user, wherein one or more additional account identifiers, that are associated with the user, remain activated;
      transmit a one-time authorization to the front-end device;
      store an indication not to authorize an additional request including the indication of the physical identifier; and
      utilize a location property associated with the request to update the fraud model based on determining that the physical identifier is associated with the indication of theft.

2. The system of claim 1, wherein the one or more processors are further configured to:
   generate an account identifier associated with the physical identifier, wherein the account identifier is a spoof identifier associated with the user.

3. The system of claim 1, wherein the one or more processors, to receive the request including the indication of the physical identifier, are configured to:
   receive the request from a middleman server, wherein the middleman server received the request from the front-end device.

4. The system of claim 1, wherein the one or more processors, to determine that the physical identifier is associated with the indication of theft, are configured to:
map data representing the physical identifier to the indication of theft using a database of identifiers associated with a plurality of users including the user.

5. The system of claim 1, wherein the one or more processors are further configured to:
receive, from the user device, the setting associated with the user that indicates the one or more additional account identifiers, that are associated with the user, to remain activated.

6. The system of claim 1, wherein the one or more processors are further configured to:
receive, from the user device, an indication of the one or more backend servers associated with the user to receive the indication of theft.

7. A method of computationally efficient theft detection, comprising:
receiving, from a front-end device, a request including an indication of a physical identifier associated with a user;
determining, using a fraud model, that the physical identifier is associated with an indication of theft;
transmitting the indication of theft to one or more backend servers associated with the user;
transmitting, to a user device, a coded message indicating theft, wherein the coded message is sent using a communication method consistent with a setting associated with the user;
transmitting a one-time authorization to the front-end device;
storing an indication not to authorize an additional request including the indication of the physical identifier; and
utilizing a location property associated with the request to update the fraud model based on determining that the physical identifier is associated with the indication of theft.

8. The method of claim 7, further comprising:
generating an account identifier associated with the physical identifier, wherein the account identifier is a spoof identifier associated with the user.

9. The method of claim 7, wherein the coded message comprises an alphanumeric sequence indicative of theft.

10. The method of claim 7, further comprising:
determining the one or more backend servers associated with the user based on an identifier associated with the user.

11. The method of claim 7, wherein transmitting the one-time authorization comprises:
transmitting the one-time authorization when the request is associated with an amount that satisfies a threshold.

12. The method of claim 7, further comprising:
receiving, from the user device, the setting associated with the user that indicates the communication method.

13. A non-transitory computer-readable medium storing a set of instructions for computationally efficient theft detection, the set of instructions comprising:
one or more instructions that, when executed by one or more processors of a device, cause the device to:
receive, from a front-end device, a request including an indication of a physical identifier associated with a user, wherein the request comprises a location property used to train a fraud model;
determine, using the fraud model, that the physical identifier is associated with an indication of theft;
transmit the indication of theft to one or more backend servers associated with the user;
store a deactivation in association with one or more account identifiers that are associated with the user; and
transmit a denial of authorization to the front-end device; and
trigger, based on the denial of authorization, a backend server to transmit, to a user device, a coded message indicating theft.

14. The non-transitory computer-readable medium of claim 13, wherein the indication of the physical identifier comprises at least two hashes of at least two numbers on the physical identifier.

15. The non-transitory computer-readable medium of claim 13, wherein the one or more instructions, when executed by the one or more processors, further cause the device to:
receive, from a user device, one or more credentials corresponding to the one or more backend servers associated with the user,
wherein the indication of theft is transmitted using the one or more credentials.

16. The non-transitory computer-readable medium of claim 13, wherein the one or more instructions, when executed by the one or more processors, further cause the device to:
receive, from an additional front-end device, a request associated with the one or more account identifiers that are associated with the user; and
transmit a denial of authorization to the additional front-end device based on the deactivation stored in association with the one or more account identifiers.

17. The non-transitory computer-readable medium of claim 13, wherein the one or more instructions, when executed by the one or more processors, further cause the device to:
update a model associated with theft based on determining that the physical identifier is associated with the indication of theft.

18. The non-transitory computer-readable medium of claim 13, wherein the one or more instructions, when executed by the one or more processors, further cause the device to:
transmit, to a middleman server, the indication of theft.

19. The non-transitory computer-readable medium of claim 13, wherein the one or more instructions, when executed by the one or more processors, further cause the device to:
store, in association with an indicator of the front-end device, a deactivation based on the indication of theft satisfying a threshold.

20. The non-transitory computer-readable medium of claim 19, wherein the one or more instructions, when executed by the one or more processors, further cause the device to:
receive, from the front-end device, an additional request; and
transmit a denial of authorization to the front-end device based on the deactivation stored in association with the indicator of the front-end device.

* * * * *